United States Patent
Dutta et al.

(10) Patent No.: US 6,501,421 B1
(45) Date of Patent: Dec. 31, 2002

(54) METHOD AND SYSTEM FOR PROVIDING A LOCATION-BASED LEGAL INFORMATION SERVICE

(75) Inventors: Rabindranath Dutta, Los Angeles, CA (US); Jacob Zachariah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/041,283

(22) Filed: Jan. 8, 2002

(51) Int. Cl.$^7$ .............................. G01S 5/14; G01C 21/30
(52) U.S. Cl. .................................. 342/357.13; 701/208
(58) Field of Search ........................... 342/357.13, 457, 342/451; 701/208, 213

(56) References Cited

U.S. PATENT DOCUMENTS

| | | | | |
|---|---|---|---|---|
| 5,247,440 A | * | 9/1993 | Capurka et al. ............... | 701/49 |
| 5,442,805 A | * | 8/1995 | Sagers ......................... | 455/456 |
| 5,485,161 A | * | 1/1996 | Vaughn .................. | 342/357.13 |
| 5,767,795 A | * | 6/1998 | Schaphorst .................. | 340/988 |
| 6,154,172 A | * | 11/2000 | Piccionelli et al. ...... | 342/357.1 |
| 2001/0037211 A1 | * | 11/2001 | McNutt et al. ................. | 705/1 |

FOREIGN PATENT DOCUMENTS

| | | | | |
|---|---|---|---|---|
| JP | 09166450 A | * | 6/1997 | ........... G01C/21/00 |

OTHER PUBLICATIONS

Yokomizo, "Location–Based Ads without E911", *m–business*, Sep. 2001, pp. 59–61.

*Sample Pages: Illustrations of Organization and Research Techniques in West's*, Third Edition, West Publishing Co., Jan. 1986, pp. 107–123.

Valente et al., "On–Line: An Architecture for Modelling Legal Information", *Proceedings of the Fifth International Conference on Artificial Intelligence and Law*, Jan. 1995, pp. 307–315.

Quaresma et al., "Using Logic Programming to Model Multi–Agent Web Legal Systems—An Application Report", *Proceedings of the EigHth International Conference on Artificial Intelligence and Law*, Jan. 2001, pp. 196–205.

Greenleaf et al., "More than wyshful thinking: AustLll's legal inferencing via the World Wide Web", *Proceedings of the Sixth International Conference on Artificial Intelligence and Law*, Jan. 1997, pp. 47–55.

Tiscornia et al., "Formalization of Legislative Documents Based on a Functional Model", *Proceedings of the Sixth International Conference on Artificial Intelligence and Law*, Jan. 1997, pp. 63–71.

Matthijssen, "An Intelligent Interface for Legal Databases", *Proceedings of the Fifth International Conference Intelligence and Law*, Jan. 1995, pp. 71–80.

* cited by examiner

*Primary Examiner*—Gregory C. Issing
(74) *Attorney, Agent, or Firm*—Leslie A. Van Leeuwen; Joseph R. Burwell (57) ABSTRACT

A method, system, apparatus, and computer program product is presented for a location-based legal information service. A subscriber to the service is assumed to have a data device, such as a mobile handheld device, and the location of the data device is determined through a positioning system, such as GPS or E911. Based on the determined location of the data device, legal information is then retrieved, such as a law or a regulation that is applicable to regulating or restricting activities at or near the determined location. The legal information can be displayed on the data device; the position of the data device can be continually monitored so that the legal information can be continually updated. Alternatively, the legal information can be used to restrict the operation of the data device, e.g., if the legal information is related to a privacy law or regulation.

30 Claims, 7 Drawing Sheets

METHOD AND SYSTEM FOR PROVIDING A LOCATION-BASED LEGAL INFORMATION SERVICE

BACKGROUND OF THE INVENTION

1. Field of the Invention

The present invention relates to an improved data processing system and, in particular, to an informational system employing position determining equipment, such as Global Positioning System (GPS) equipment. Still more particularly, the present invention provides a method and system for a location-based information retrieval service.

2. Description of Related Art

Most residents of a region or country are law-abiding citizens. Interestingly, a typical citizen's legal knowledge is usually based on common sense with limited knowledge of actual statutes and regulations. Many citizens gain their legal knowledge from friends, family members, co-workers, or colleagues over a long period of time and through a variety of experiences.

At some point in time, most citizens learn about the general legal principle that one's ignorance of the existence of a law is not a defense when criminally charged with violating the law. Hence, when a typical law-abiding citizen believes that laws may exist that somehow limit his or her freedom of action, he or she often feels compelled to investigate whether or not any such laws exist.

Learning the extent of laws on a self-determined, need-to-know basis is often sufficient for the activities of most citizens. Generally, a citizen has enough time and resources to discover applicable laws prior to participating in an activity when the citizen has any doubts about the existence of applicable laws. For example, public libraries often have legal information resources, and online legal databases may be researched through the Internet. If necessary, a citizen can consult an attorney for an opinion about the existence of applicable laws prior to engaging in a desired activity. When a law is found that somehow limits the citizen's freedom of action, the citizen can modify the planned activity so that a law is not violated.

The concept that a legal principle can be communicated to a person through an electronic information medium is particularly important herein. A law is a principle governing conduct, actions, or procedures that is prescribed or formally recognized as binding or enforced by a controlling authority. Legal principles are often promulgated in many forms, such as statutes, rules, regulations, and ordinances, but law may also be found in the whole body of legal practices and customs, such as those principles that are said to be found in common law. For the purposes required herein, though, these distinctions for legal principles are somewhat unnecessary, and the terms may be used interchangeably.

Jurisdiction is another legal concept of which most citizens are aware. Jurisdiction can be defined as a geographical area to which a governmental entity is limited in its power, right, or authority to interpret, exercise, or apply law. A conscientious citizen attempts to learn the laws that are applicable to a citizen's desired activity within the jurisdiction in which the citizen participates in the activity. Even though a given set of laws is only enforceable within certain jurisdictional boundaries, a person who engages in an activity should be aware of the fact that similar laws may exist in different jurisdictions. A conscientious citizen will learn and obey the applicable statutes and regulations when engaging in an activity in different jurisdictions.

In many instances, though, someone may not have sufficient time or resources to initiate a detailed survey of applicable laws prior to participating in an activity in an unfamiliar jurisdiction. Rather than forego the opportunity to engage in the activity, someone may adhere to known laws from a familiar jurisdiction while participating in the activity in the unfamiliar jurisdiction. In this manner, a person engaging in the activity implicitly accepts the risks involved in potentially violating laws within the unfamiliar jurisdiction about which the person has no knowledge.

In fact, the total number of legal infractions that occur tends to increase over time for a variety of reasons. Even if no new statutes or regulations for a given activity are promulgated, the number of legal violations associated with the given activity tends to increase over time. With an ever growing population, if the same percentage of a given population participates in the particular activity, an increasing number of people tend to engage in an activity that was once possibly enjoyed by relatively few people. Hence, an increasing number of people may tend to violate legal restrictions on that activity.

Over time, standards of living tend to be raised, and people have more disposable income to be used on recreational activities. Since recreational activities are inherently performed only occasionally, participators may often be ignorant of applicable laws. Moreover, diverse recreational activities are continually created, and more statutes and regulations may be promulgated to restrict those activities.

In addition, higher standards of living have created a more mobile population, thereby creating an environment in which more people are unaware of the existence of local statutes or local regulations within jurisdictions in which they spend relatively little time and, therefore, have reduced incentive to learn the local laws.

For example, many recreational activities, such as boating, are often restricted in some manner by a set of laws, and boat operators are aware that boating laws may vary among jurisdictions. However, boating is an inherently mobile activity that may carry the boat's crew from jurisdiction to jurisdiction. While a conscientious crew may attempt to learn local laws concerning local waterways, there may be many obscure local statutes and local regulations of which the crew is unaware and which are difficult to discover in an on-going manner. As the number of boat owners and operators increases within the growing population, jurisdictions may tend to promulgate boating laws to control the activities of more crowded waterways, thereby making it more difficult for many boat owners and operators to remain aware of currently applicable laws.

Therefore, it would be advantageous to have a method and a system for providing a legal information service such that conscientious, law-abiding citizens are aware of laws that are jurisdictionally applicable to their activities prior to participating in legally restricted activities.

SUMMARY OF THE INVENTION

A method, a system, an apparatus, and a computer program product are presented for a location-based legal information service. A subscriber to the service is assumed to have a data device, such as a mobile handheld device, and the location of the data device is determined through a positioning system, such as GPS or E911. Based on the determined location of the data device, legal information is then retrieved, such as a law or a regulation that is applicable to regulating or restricting activities at or near the determined location. The legal information can be displayed on the data device; the position of the data device can be continually monitored so that the legal information can be continually updated. Alternatively, the legal information can be used to restrict the operation of the data device, e.g., if the legal information is related to a privacy law or regulation.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is a novel form of an information dissemination service. In general, the devices that may comprise or relate to the present invention are assumed to include data processing technology. Therefore, as background, a typical organization of hardware and software components within a distributed data processing system is described prior to describing the present invention in more detail.

Figure 1A:
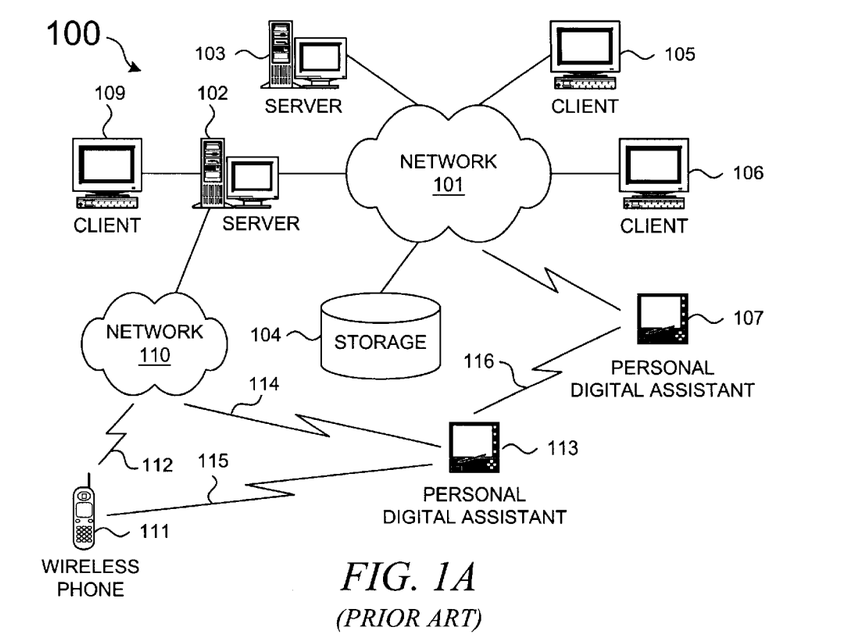
FIG. 1A depicts a typical distributed data processing system in which the present invention may be implemented.

With reference now to the figures, FIG. 1A depicts a typical network of data processing systems, each of which may implement some aspect of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown. It should be noted that the distributed data processing system shown in FIG. 1A is contemplated as being fully able to support a variety of peer-to-peer subnets and peer-to-peer services.

In the depicted example, distributed data processing system 100 may include the Internet with network 101 representing a global collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), a wireless LAN, or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
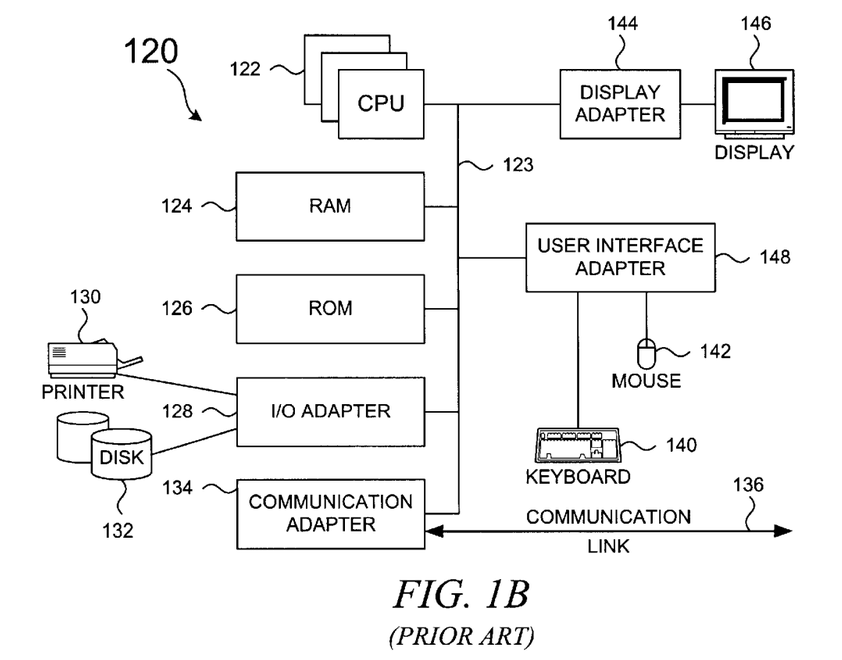
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140, mouse 142, or other devices not shown, such as a touch screen, stylus, or microphone. Display adapter 144 connects system bus 123 to display 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Linux® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to a novel type of information dissemination service for mobile users. Before describing the present invention in more detail, though, some background information is provided on mobile information services in general.

Technological progress can be classified and analyzed within certain categories, e.g., progress in information services versus progress in the miniaturization of digital devices. With respect to progress within information services, commercial and personal use of the Internet has increased dramatically such that most electronic services now occur in some manner through the Internet rather than completely through private digital communication networks. With respect to progress in the miniaturization of digital devices, many different types of portable digital devices are now available, such as laptop computers, mobile phones, and personal digital assistants (PDAs).

These technological trends are interconnected such that progress within one category spurs innovation within another category. For example, the importance of Internet-based communication has increased demands from consumers that portable digital devices should have Internet-connectivity in some form. While laptop computers have been able to connect to the Internet through standard modems for many years, many different types of portable digital devices have become individually connectable to the Internet, i.e. Internet-enabled. As a result, Internet access is increasingly occurring through portable devices, and more importantly, through wireless Internet connections.

Although many people use Internet-enabled, mobile devices, it has been widely recognized that many more people would purchase and use such devices if more information services were accessible from such devices; information services for mobile devices are sometimes called "m-commerce" as opposed to "e-commerce". However, the availability of information services for such devices depends upon the ability of enterprises to create profitable revenue streams while providing these information services. In turn, a profitable business model depends upon the projected adoption rate for the use of such devices by consumers. Hence, as is the case with many new technologies, information services for mobile devices have been slow in acquiring users.

As is typical in many services, information services for mobile devices have turned to advertisers as a source of potential revenue. As a result, the types of information services for mobile devices that have been developed are related to the categories of information that would be complementary to the needs of advertisers. The most prevalent example for a potentially successful information service for mobile devices is a location-based business directory that enables consumers to look-up business establishments, e.g., restaurants or convenience stores. A consumer that has access to a mobile information device may then use an associated information service to locate a desired business establishment that is near the consumer at any given location and at any given point in time.

In order to implement a location-based information service, the location of a user must be known to the information service provider. The location or position of a user may be determined in a variety of well-known manners. The Global Positioning System (GPS) is a network of satellites that broadcast a set of time and position signals. A device with a GPS receiver or processor detects a set of satellite signals, and after comparing the differences in the signals, the GPS receiver can determine the geographical coordinates of the receiving device. The receiving device can then use its GPS location in conjunction with an application on the receiving device, or the receiving device may act as a client and report its location to another device, such as a server, which then uses the client's location information for some purpose. If the receiving device is a mobile information device similar to the devices that were described above, then the GPS coordinates of the mobile information device allow an information service provider to disseminate location-based information to the mobile information device on a real-time basis.

Another well-known positioning system in the USA is the so-called Enhanced 911 (E911) system. The Federal Communications Commission (FCC) has adopted regulations to improve the availability, quality, and reliability of 911 emergency services for wireless phone users by providing emergency service personnel with location information that will enable them to locate wireless 911 callers much more quickly. The basic 911 rules require wireless carriers to transmit all 911 calls to a Public Safety Answering Point (PSAP) without regard to the carrier's validation procedures intended to identify and intercept calls from non-subscribers; covered carriers are required to provide to the PSAP the telephone number of the originator of a 911 call and the location of the cell site or base station receiving a 911 call. Wireless carriers are required to provide Automatic Location Identification (ALI) as part of Phase II E911 implementation beginning Oct. 1, 2001. ALI information can be derived through either network-based location determination technologies, such as determining an accurate caller location within a cell, or handset-based location determination technologies, such as automatic GPS reporting from the caller's handset. In a manner similar to that mentioned above, the E911 or ALI information allows an information service provider to disseminate location-based information to mobile handset on a real-time basis.

While advertiser-supported, location-based, information services may be useful both to consumers and to advertisers, users of mobile devices have information needs that are not necessarily related to the needs of advertisers. Hence, within the context of current technology described in the background information above, there is still a general need for more location-based information services that are personally useful to users of mobile information devices.

The present invention recognizes that a specialized information service may be useful for timely providing location-based legal information to conscientious, law-abiding citizens. As described above, a citizen is sometimes aware that laws may exist that are applicable to the citizen's activities, yet the citizen does not know applicable laws or does not have easy access to information about applicable laws. When a user desires information about legal restrictions concerning the user's activities, the present invention provides a location-based legal information service that can disseminate the desired information to the user's mobile information device so that a user is aware of the statutes and the regulations that are applicable to the user's activities prior to engaging in the activities. Presumably, the user would then ensure that his or her activities are performed in accordance with applicable laws.

The methodology for the location-based legal information service of the present invention is described below in more detail with respect to the remaining figures. It should be noted that the present invention is not limited to any particular location determination technology. As noted above, various location determination technologies exist and have been incorporated into mobile information devices, such as GPS receivers and E911 subsystems. The present invention is operable with a variety of location determination technologies, including GPS, E911, or other location determination technologies.

Figure 2A:
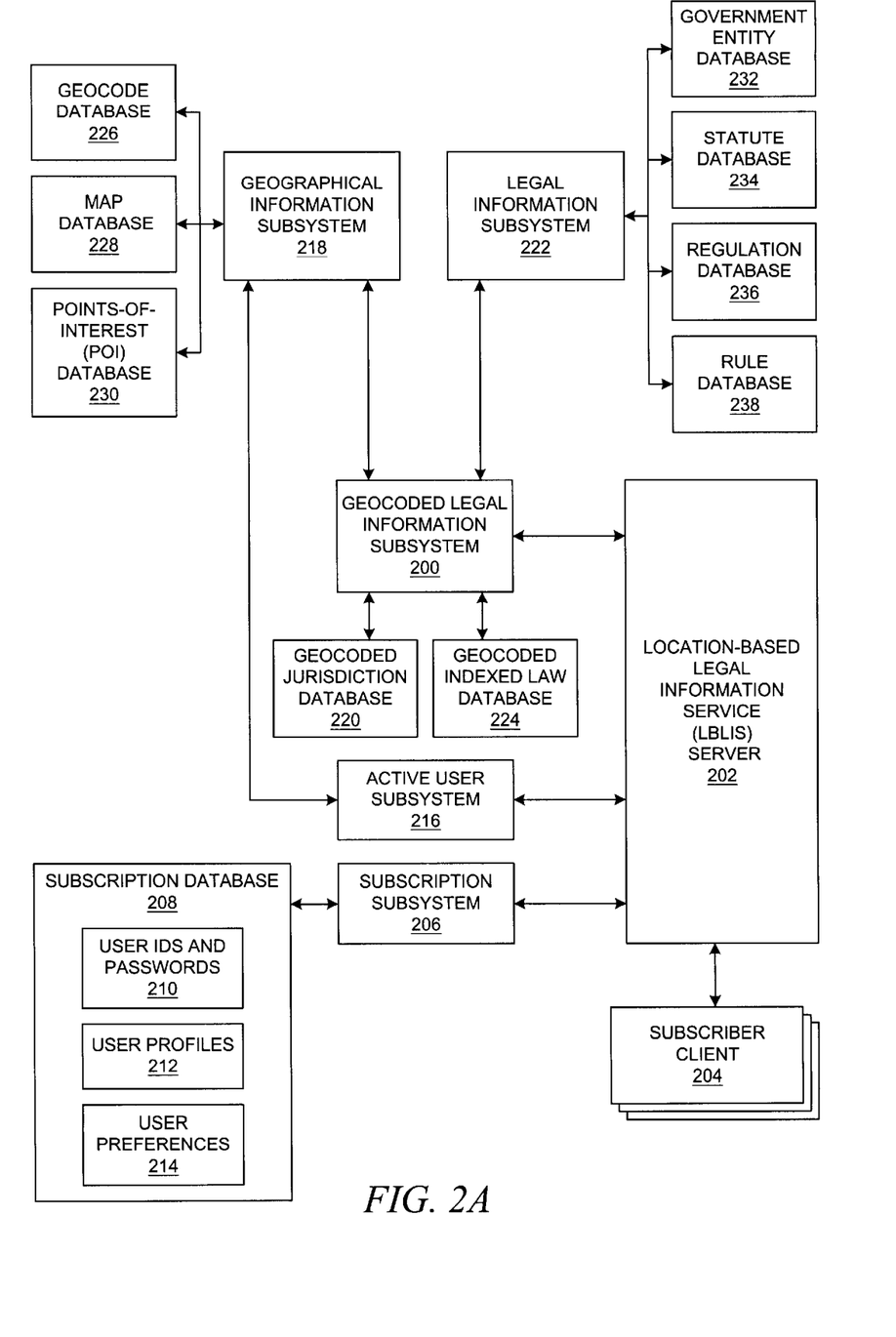
FIG. 2A is a block diagram depicting an organization of system components in a location-based legal information service in accordance with a preferred embodiment of the present invention.

With reference now to FIG. 2A, a block diagram depicts an organization of system components in a location-based legal information service in accordance with a preferred embodiment of the present invention. It should be understood that the selection and connections of components are merely illustrative of the datastores and functionality that may be required in a given embodiment of a location-based legal information service; other embodiments may comprise fewer or additional datastores or components as necessary to provide the desired functionality in a given embodiment of the present invention.

The location-based legal information service, or LBLIS, is centered on geocoded legal information subsystem (GLIS) 200, which coordinates the compilation, storage, and retrieval of various forms of information, as is described in more detail below. LBLIS server 202 interacts with geocoded legal information subsystem 200 to retrieve information for subscribers of the location-based legal information service; LBLIS server 202 may be similar to the server devices described above with respect to FIG. 1A and FIG. 1B.

Each subscriber is assumed to be carrying a mobile data device that acts as a client device to LBLIS server 202; these mobile data devices are shown as subscriber clients 204 and may be similar to the client devices described above with respect to FIG. 1A and FIG. 1B. Subscriber clients 204 receive legal information from the service based on the location of the client device, as described in more detail further below.

LBLIS server 202 authenticates a subscriber client through subscription subsystem 206, which maintains subscription database 208 that contains information for each subscriber. Subscription database 208 stores user identifiers and associated passwords 210 for authenticating a client device and authorizing access by the client device to the functionality that is provided by LBLIS server 202. Subscription database 208 has user profiles 212 that contain information about the particular usage patterns of individual users of the system, including account information about the financial aspects or status of a user's subscription so that subscribers receive services for which the user has paid. Subscription database 208 also stores user preferences 214 that are provided by a user and applied by the service to customize aspects of the service for a particular user.

The location-based legal information service may provide various levels of service or various types of service and then charge users accordingly. While subscription subsystem 206 may be used to ensure that only paying users have access to the service, it should be noted that the location-based legal information service may be provided free-of-charge or may be provided along with, or bundled with, other location-based information services.

As the mobile data device of a subscribing user moves from location to location, LBLIS server 202 receives updates about significant changes in position from active user subsystem 216, which tracks each active user or subscriber. As a subscriber moves, the subscriber's mobile data device also moves, and active user subsystem 216 can determine any changes in position of a mobile data device through the active user subsystem's connections with the appropriate location determination system, such as a GPS system or an E911 system, as previously described above. Given that the location determination system only determines position within a certain accuracy, e.g., 10 or 30 meters, the active user subsystem may have various system-operator-specified threshold parameters that assist in determining when a change in a user's position is significant, i.e., when the change in position should trigger the operation of other functionality within the location-based legal information service. Alternatively or in addition, active user subsystem 216 may access geographical information subsystem 218 for support in determining when a change in a subscriber's position is geographically significant. When a change in a subscriber's position is determined to be significant, active user subsystem 216 provides the appropriate information to the LBLIS server, such as the subscriber's previous and current positions.

When notified of a subscriber's new location, LBLIS server 202 can determine whether the subscriber has moved to a new location that warrants sending an update of geocoded legal information to the subscriber's mobile data device. In other words, the active user subsystem determines geographically significant movements by a subscriber. However, not every geographically significant movement is legally significant. Hence, the LBLIS server receives indications of geographically significant movements by a subscriber and then must determine whether the discovered movement is legally significant by reference to the geocoded legal information subsystem.

For example, the active user subsystem may determine that a subscriber has moved one kilometer, and the active user subsystem notifies the LBLIS server. After consulting with the geocoded legal information subsystem, though, the LBLIS server may determine that the subscriber has not moved into any new jurisdictions or into any new areas that are legally significant, so the LBLIS server does not need to send an update to the subscriber's mobile data device. On the other hand, if the subscriber's has moved to a location that is included within a different legal jurisdiction or is somehow legally significant, then the LBLIS server may send an update to the subscriber's mobile data device.

It should be noted that the format of an LBLIS update from the location-based legal information service's infrastructure to a subscriber's mobile data device may be implemented in a variety of configurations and protocols. In addition, the format may depend on the technology available for accomplishing the update and may also depend on the characteristics of a subscriber's mobile data device. The service may be capable of providing a variety of LBLIS update formats simultaneously for different subscribers.

Many different data models may be employed by the location-based legal information service. Three possible data models for the service are a client-centric model, a server-centric model, or a hybrid model that is a combination of portions of the server-centric model and the client-centric model. In the client-centric model, either all of (or a majority of) geospatially significant legal information for a given subscriber at a given location is pushed from the LBLIS server to a subscriber client device prior to a point in time that a subscriber would need the information. If the client device has a significant amount of storage space to be devoted to the service, then the service may initially download a legal information database to a subscriber's client device. At appropriate events, such as when a subscriber moves into a new jurisdiction, the service transmits an update containing necessary legal information to the client device.

For example, the following description provides a more detailed example of the client-centric data model. When a user initially subscribes for the location-based legal information service, the user may indicate the type of mobile data device that will be used with the service, or the information about the subscriber's mobile data device may be automatically provided or retrieved through an appropriate protocol. The subscription subsystem may store this device type as a portion of the subscriber's user profile information. If the subscriber's mobile data device has the ability to store a large database, then the service may download a large amount of geocoded legal information to the subscriber's mobile data device; the geocoded legal information may be specifically tailored to the expected geographical area in which the subscriber lives. As the subscriber roams around a particular geographic region, an application on the subscriber's mobile data device tracks the current position and then presents legal information to the subscriber based on the location of the mobile data device. The application on the subscriber's mobile data device is primarily responsible for selecting the legal information that the subscriber needs to see. To assist in this operation, the client device may cache a copy or a portion of the user profile and/or user preferences.

In addition, the location-based legal information service also tracks the position of the subscriber. Since the location-based legal information service can maintain metadata within a subscriber's user profile about the contents of the legal information database on the subscriber's client device, the location-based legal information service can determine when that particular client device requires additional geocoded legal information. At an appropriate time, such as small loads on the server or some other period of time, the service can download an update of additional geocoded legal information to the client device. Of course, the service can determine whether or not an update is urgently needed and factor this determination into the decision of the appropriate time to send an update to the client device. In this manner, a substantial amount of geocoded legal information may be cached or maintained on a client device with periodic or intermittent updates that are pushed from the LBLIS server to a client device.

In contrast to the client-centric model, relatively small amounts of legal information are maintained on a client device with a server-centric model, and relatively little processing is performed on the client device. Rather, the location-based legal information service tracks the position of the subscriber and sends an update comprising relatively small amounts of cacheable legal information to a client device. When the client device receives the legal information, it is immediately presented in some form to the subscriber on the display of the client device. In this manner, the LBLIS server is primarily responsible for storing and selecting the legal information that the subscriber needs to see. Moreover, most or all geospatial processing is performed by the LBLIS infrastructure and not by the client device; hence, the content of the legal information updates could be simple text messages rather than geocoded legal information because the client device does not perform any geospatially-related processing.

Geocoded legal information subsystem 200 creates, accesses, and/or maintains databases as may be necessary to perform its functions. In general, these databases may be created in some manner prior to actively tracking and servicing subscribers. Geocoded jurisdiction database 220 comprises geospatial information about jurisdictions, such as the geospatial boundaries of municipal, state, and federal jurisdictions; information about other institutional boundaries may also be included as necessary. Geocoded legal information subsystem 200 may create geocoded jurisdiction database 220 by retrieving legal definitions of jurisdictions from legal information subsystem 222 and then manually and/or programmatically cross-referencing these definitions with geospatial information that has been retrieved from geographical information subsystem 218. At some later point in time, geocoded legal information subsystem 200 can use geocoded jurisdiction database 220 to determine a set of jurisdictions for a given geographical location or to determine a geographical region for a specified jurisdiction.

Geocoded indexed law database 224 comprises an index of ordinances, statutes, regulations, or other types of legal information for jurisdictions that match the geographical regions in which the location-based legal information service is provided. Geocoded legal information subsystem 200 may create geocoded indexed law database 224 by manually and/or programmatically cross-referencing legal information from legal information subsystem 222 with geospatial information that has been retrieved from geographical information subsystem 218. At some later point in time, geocoded legal information subsystem 200 can use geocoded indexed law database 224 to determine relevant legal information for a given geographical location.

Geospatially-related processing for the location-based legal information service can be concentrated within geographical information subsystem 218, which accesses and/or maintains geospatially-related databases. For example, as noted above, geographical information subsystem 218 may determine when a change in a subscriber's position is geographically significant. In addition, geocoded legal information subsystem 200 may rely upon geographical information subsystem 218 for geospatial processing as necessary.

Geographical information subsystem 218 may rely upon various geospatial databases that may be provided by third-party vendors. Geocode database 226 may contain information about geospatially-related systems, such as information about different types of geospatial representations and the manner in which these geospatial representations are used in GPS systems, E911 systems, or other systems. Map database 228 may contain electronic mapping information, possibly from different sources for different purposes, such as aeronautical maps, nautical maps, geophysical terrain maps, etc. Points-of-interest (POI) database 230 may contain indexed lists of significant points-of-interest, which may include the identity and location of many different entities, such as schools, churches, post offices, government buildings, marinas, parks, hospitals, or other entities. POI database 230 and map database 228 may contain some overlapping information, e.g., both databases may contain a information about a particular bridge.

Legal information subsystem 222 may be associated with various legal databases that may be provided by third-party vendors. Government entity database 232 may contain lists of government entities that act as sources of legal information, such legislatures, regulatory agencies, or other institutions. Statute database 234, regulation database 236, and rule database 238 represent many different types and forms of legal databases. For example, statute database 234 may comprise an indexed database of statutes that can be searched by keywords to determine relevant statutes for a given topic; these types of databases are commercially available from various publishing companies.

As noted above, legal information subsystem 222 may be associated with various legal databases that may be provided by third-party vendors. For example, West Publishing Company publishes the "United States Code Annotated", which is a compilation of the United States Code and indices of the titles and sections of the United States Code, which is the body of federal statutes promulgated by the United States Congress. The "United States Code Annotated" contains references to relevant statutes for a particular legal topic that can be discovered by using a keyword that is associated with the legal topic; the references to the statutes comprise an identifier for the title and section of a relevant statute. Electronic versions and hardcopy versions of such legal publications may be organized in similar manners.

Since each source of law is limited to one or more particular jurisdictions, a legal publication, e.g., the "United States Code Annotated", can be associated with jurisdictional information. Geocoded legal information subsystem 200 may then access or retrieve legal information databases and metadata using an indication of a jurisdiction to which the legal information database is associated.

Figure 2B:
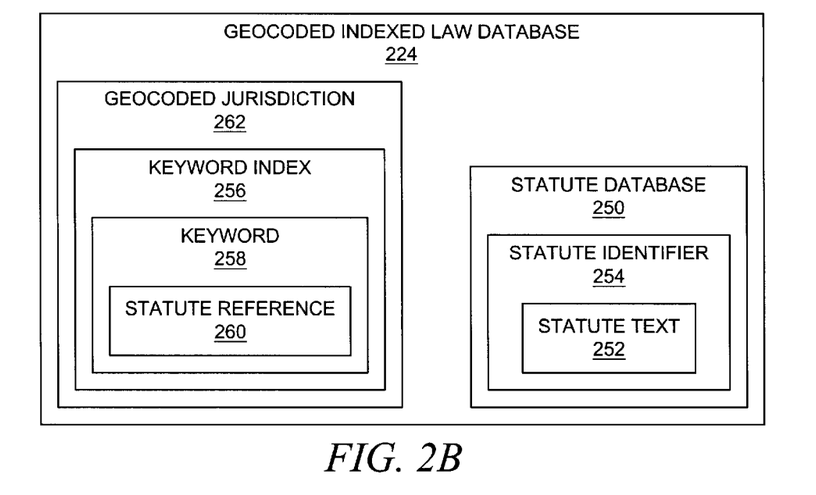
FIG. 2B is a block diagram depicting a data structure for a geocoded indexed law database.

With reference now to FIG. 2B, a block diagram depicts a data structure for a geocoded indexed law database. Geocoded indexed law database 224 in FIG. 2B is identical to geocoded indexed law database 224 in FIG. 2A; FIG. 2B merely provides further detail for the structure of one of the possible databases that may be found within the location-based legal information service. It should be noted, however, that the number, contents, and structure of the databases within the location-based legal information service of the present invention may vary with each particular implementation of the present invention.

In the example shown in FIG. 2B, a statute database from a third-party vendor has been associated with geocoded information as required by the location-based legal information service. Statute database 250 has been organized to allow a look-up process to find portions of statute text 252 using statute identifier 254; the format of a statute identifier may be dictated by the legislative entity that promulgated a set of statutes.

A different third-party vendor may publish keyword index 256 that is associated with statute database 250. Keyword index 256 has been organized to allow a look-up process to find relevant statutes using keyword 258. Statute reference 260 associated with keyword 258 identifies a statute or portion of a statute that is relevant to a particular keyword. Statute reference 260 may be similar or identical to a statute identifier within statute database 250.

Since each set of statutes applies to one or more particular jurisdictions, each keyword index is also related to one or more particular jurisdictions. Geocoded jurisdiction information 262 can be associated with each keyword index, thereby allowing a relevant keyword index for a particular jurisdiction to be found with an appropriate jurisdictional identifier or with appropriate geographical information. Geocoded jurisdiction information 262 may be similar to the information that is stored within geocoded jurisdiction database 220.

As described previously, user preferences 214 are associated with each subscriber. Depending on whether a client-centric or server-centric data model is implemented for the location-based legal information service, user preferences 214 are available at the client or server as necessary for the process that is discovering legal information to be presented to a subscriber. A portion of user preferences 214 comprises a selection of categories of legal information that is desired by the subscriber. When the subscriber is interested in learning about any applicable legal restrictions on a particular activity in various locations, then the subscriber selects the appropriate category in a user interface. Each category may be associated with a predetermined set of keywords. Given a particular geographic location for a subscriber of the location-based legal information service, geocoded legal information subsystem 200 can use either geocoded jurisdiction database 220 or geocoded indexed law database 224 to determine the jurisdictions that include the given geographic location. Once the applicable jurisdictions are determined, then any statutes that are relevant to the subscriber's previously specified interests can be discovered by using the predetermined keywords that are associated with the subscriber's interests.

It should be noted that geocoded legal information subsystem 200 may operate in a variety of manners that depend upon the particular implementation of the present invention. In FIG. 2A and FIG. 2B, a set of databases and look-up processes uses keywords to determine relevant statutes to be presented to a subscriber. Alternatively, legal knowledge may be modeled using a variety of artificial intelligence techniques. For example, goal-oriented programming languages, such as Prolog, may be used to create an inference engine that determines relevant statutes for a given subscriber. In other words, a knowledge model comprising a large number of rules can be created via knowledge-engineering techniques. In this type of system, a set of facts about a subscriber, such as geographical location and selected activities, could be asserted within the inference engine; as a result, a set of rules may be determined to be applicable, i.e. true. These rules would then reference appropriate portions of legal texts, such as a section of the United States Code, that could be retrieved for display to the subscriber. Other types of legal knowledge modeling could also be used.

Figure 3:
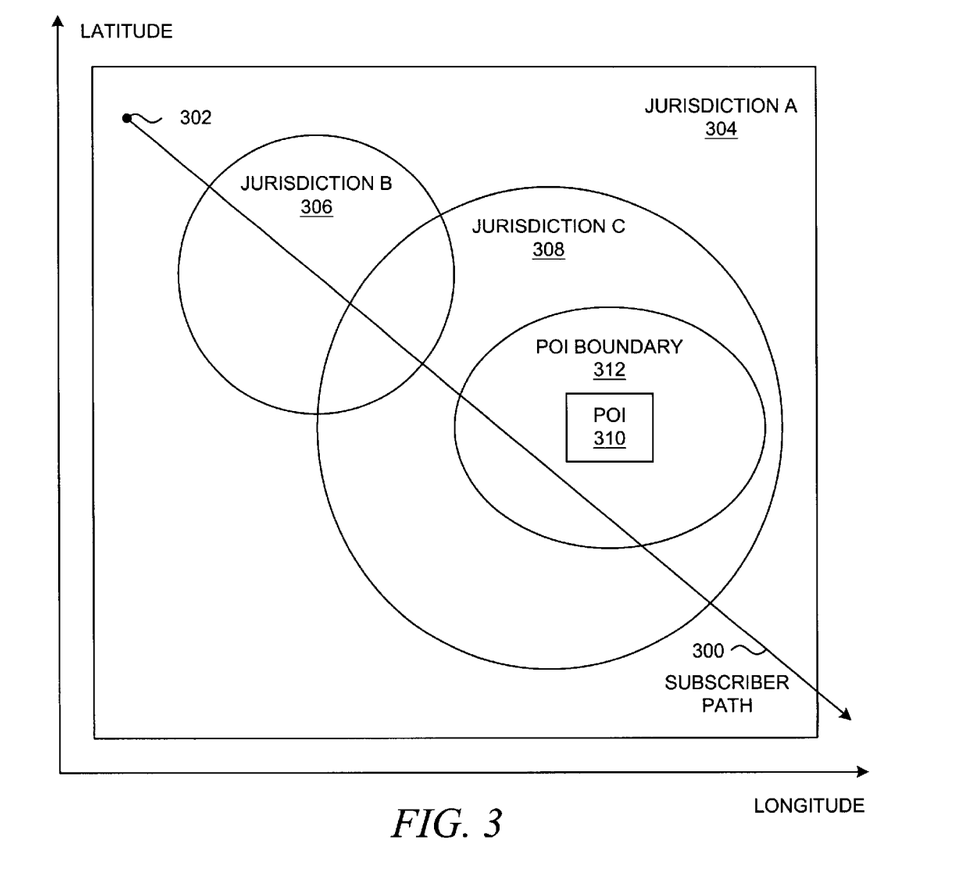
FIG. 3 is a diagram depicting a geographical coordinate system for an abstract geographical region through which a subscriber of a location-based legal information service may move.

With reference now to FIG. 3, a diagram depicts a geographical coordinate system for an abstract geographical region through which a subscriber of a location-based legal information service may move. It may be assumed that a subscriber desires to have legal information presented on a mobile data device by a location-based legal information service. At any point within the geographical region, the subscriber can view location-based legal information on the subscriber's mobile data device. Although the subscriber may be able to browse a wide variety of legal information on the subscriber's mobile data device, the subscriber would most likely desire to view legal information that is relevant to previously specified activities. Hence, the location-based legal information service attempts to present relevant legal information automatically.

Various jurisdictions are shown within FIG. 3 in addition to subscriber path 300. At point 302, a subscriber is located within jurisdiction A 304. Any legal information that is related to activities-of-interest to the subscriber can be presented on the subscriber's mobile data device, particularly legal information that is associated with jurisdiction A 304.

As a subscriber of the location-based legal information service moves from point 302 along subscriber path 300, which might represent a particular road or highway, the subscriber enters and exits various jurisdictions. As described above with respect to FIG. 2A, after the subscriber's movement has been determined to be geographically significant by the location-based legal information service, the subscriber's movement is also checked to determine whether the subscriber's movement is legally significant. If the subscriber's movement is determined to be legally significant, then keywords that are associated with the specified interests of the subscriber may be retrieved and used to find relevant laws, as described above with respect to FIG. 2B.

As the subscriber enters jurisdiction B 306, legal information that is associated with jurisdiction B 306 may be presented along with the previously shown legal information that is associated with jurisdiction A 304. In a similar manner, as the subscriber enters jurisdiction C 308, legal information that is associated with jurisdiction C 308 may be presented along with the previously shown legal information that is associated with jurisdiction A 304 and jurisdiction B 306.

POI 310 is located within jurisdiction A 304 and jurisdiction C 308, and one of these jurisdictions may have a law concerning a type of point-of-interest that is represented by POI 310. For example, POI 310 may be a school, and jurisdiction A 304 may have a statute that only peace officers may carry a gun within 100 meters of a school, which may be of interest to a subscriber who carries a gun with a concealed weapon permit. In order to alert a subscriber to the applicability of a point-specific law that is associated with POI 310, the location-based legal information service must monitor the subscriber's movements with respect to POI boundary 312 that represents an area around POI 310 to which a particular law is applicable. As the subscriber enters POI boundary 312, legal information that is associated with POI boundary 312 may be presented on the subscriber's mobile data device.

As the subscriber moves along subscriber path 300 and exits POI boundary 312 and jurisdiction C 308, laws that are relevant to the subscriber's specified activities or interests may be removed from the display of the mobile data device. In this manner, the automatic determination of legal information based on the subscriber's location may change over time as the subscriber's geographic location changes.

With reference now to FIGS. 4A–4G, a set of diagrams represents a set of simple graphical user interface snapshots that may be used on a subscriber's mobile data device in relation to the subscriber's use of a location-based legal information service. It should be noted that FIGS. 4A–4G are merely examples and that the graphical user interface associated with the presentation of data from the location-based legal information service may vary depending on the implementation of the present invention. For example, the operating system on a particular mobile data device may dictate the manner in which information can be presented.

Figure 4A:
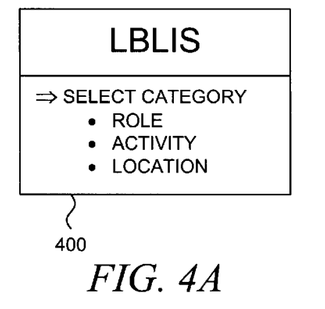
FIGS. 4A–4G is a set of diagrams depicting simple graphical user interface snapshots that may be used on a subscriber's mobile data device in relation to the subscriber's use of a location-based legal information service.
Figure 4B:
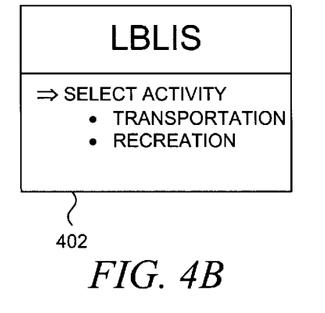
Figure 4C:
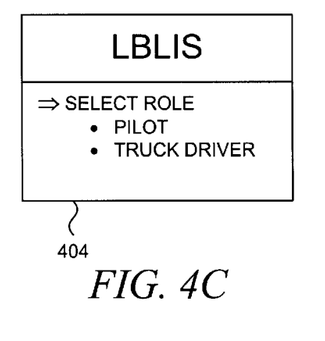
Figure 4D:
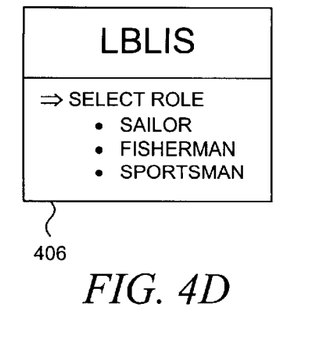

FIGS. 4A–4D show various menus that may be presented to a subscriber to customize the operation of the location-based legal information service for the subscriber's desires or needs. Referring to FIG. 4A, menu 400 shows that the legal information that is presented may be categorized in accordance with a particular user role, user activity, or user location; alternatively, these categories may be combined such that the combination of categories is applied to the selection of legal information. Referring to FIG. 4B, menu 402 shows an example of two activities from which the user may choose: transportation or recreation. Referring to FIG. 4C, menu 404 shows an example of two roles from which the user may choose: pilot or truck driver. Referring to FIG. 4D, menu 406 shows an example of three roles from which the user may choose: sailor, fisherman, or sportsman.

In these examples, the roles shown in FIG. 4C are related to the "transportation" activity shown in FIG. 4B, and the roles shown in FIG. 4D are related to the "recreation" activity shown in FIG. 4B. However, many other roles or activities may be shown, and the selection of a role or an activity may or may not restrict the choices that are available within another category.

Figure 4E:
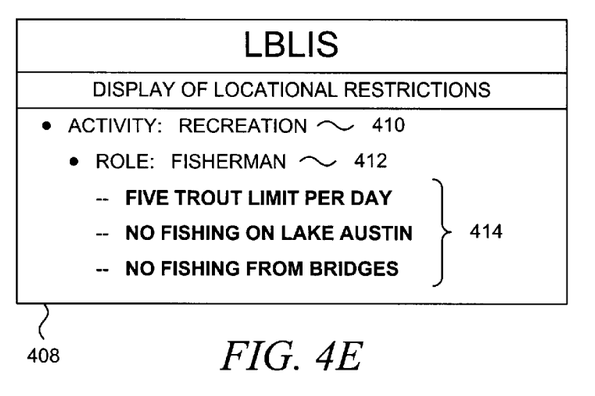
Figure 4F:
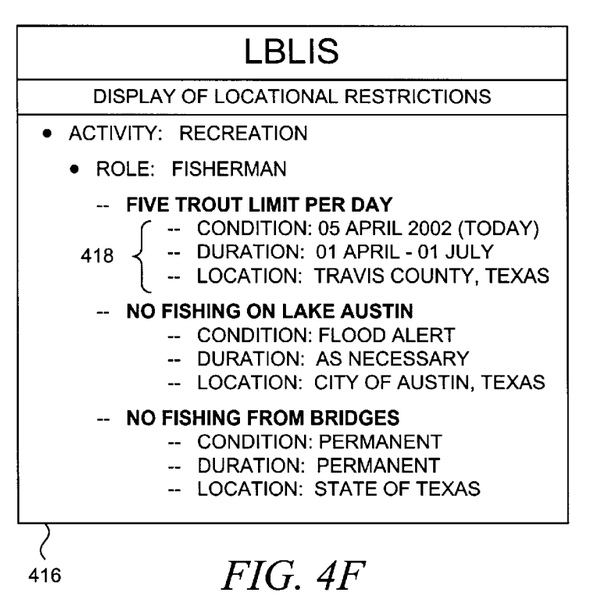

Referring to FIG. 4E, display 408 shows locational restrictions that have been determined based on the subscriber's current location and the subscriber's previously specified preferences. In this example, the subscriber has previously specified a desire to be alerted to laws that are relevant to chosen activity 410 and to chosen role 412, which are "recreation" and "fisherman", respectively. In response, laws or legal restrictions 414 have been determined to be applicable to the subscriber's current location. As the subscriber moves, the location-based legal information service would update the display on the subscriber's mobile data device to show the relevant law or legal restrictions. Referring to FIG. 4F, display 416 shows that legal information 414 may be expanded to show more detail about the conditions, facts, or rules that have caused a particular law or legal restriction to have been displayed. For example, detailed information 418 shows a particular condition that is associated with the legal restriction, the duration of time during which the particular condition or legal restriction is valid, and a location or region in which the particular condition or legal restriction is valid.

Figure 4G:
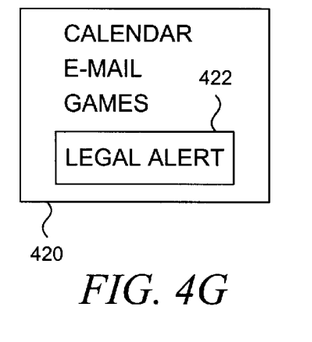

Referring to FIG. 4G, menu 420 shows various menu items associated with applications on the subscriber's mobile data device. In this example, menu item 422 is displayed when an update of the location-based legal information should be brought to the subscriber's attention; the subscriber's selection of menu item 422 would cause location-based legal information, such as display 408 or 416, to be shown on the mobile data device. As described above with respect to FIG. 2A, these types of updates may be determined by a local application that is executing on the subscriber's mobile data device, or these types of updates may be received from the LBLIS server.

Figure 5A:
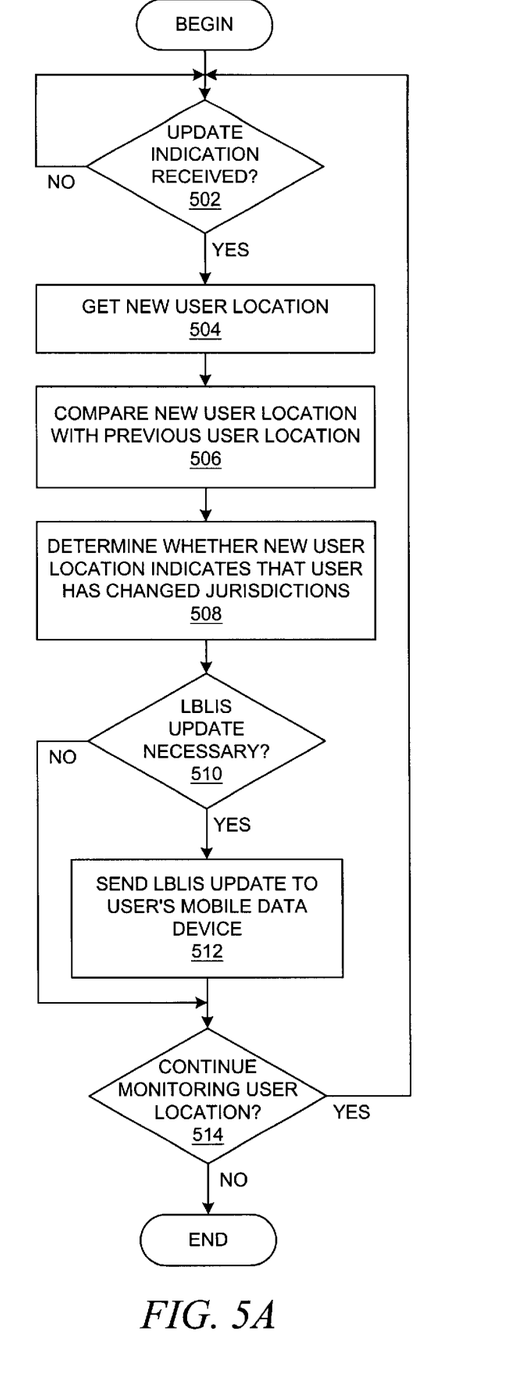
FIG. 5A is a flowchart depicting an overall process for updating legal information on a subscriber's mobile data device via a location-based legal information service that is implemented in accordance with the present invention.

With reference to FIG. 5A, a flowchart depicts an overall process for updating legal information on a subscriber's mobile data device via a location-based legal information service that is implemented in accordance with the present invention. The process begins by determining whether or not an update indication is received for a particular subscriber/user that indicates whether the subscriber's movement is geographically significant (step 502). If not, then the process merely cycles as it waits for additional input.

If an update indication is received, then the subscriber's new location is retrieved (step 504), and the subscriber's new location is compared with the subscriber's previous location (step 506). A determination is then made as to whether or not the subscriber's new location indicates that the subscriber has entered or exited any jurisdictions (step 508), which may require an update for this particular subscriber. If an update to the subscriber's legal information is necessary (step 510), then the process sends a location-based legal information service update to the subscriber's mobile data device (step 512). If the update mechanism is operating on the mobile data device, then the appropriate information is retrieved from the local legal information cache or database on the mobile data device and then shown on the display of the mobile data device. If the update mechanism is operating on an LBLIS server, the appropriate information is sent to the subscriber's mobile data device for subsequent display on the mobile data device. As noted above, alternative update methodologies may be employed.

If an update to the subscriber's legal information is not necessary at step 510, then the process branches so that an update is not made. In any case, after the mobile data device has been updated, a determination is made as to whether or not the subscriber's location should continue to be monitored (step 514). For example, the subscriber may turn off the mobile data device such that the location-based legal information service can no longer monitor its position, or the subscriber may log off from the service. If the subscriber's location should continue to be monitored, then the process branches back to step 502; if not, then the process is complete for this particular subscriber.

Figure 5B:
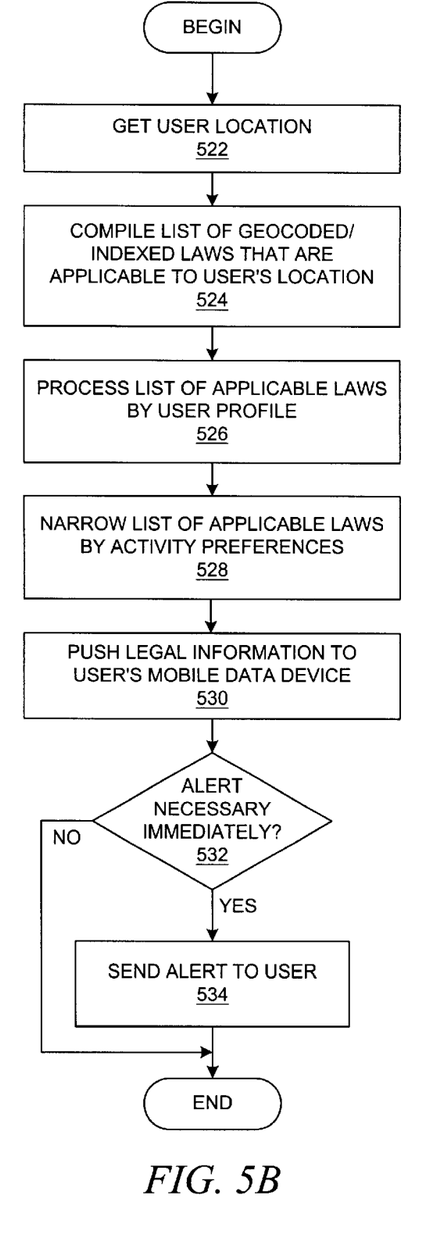
FIG. 5B is a flowchart depicting a server-based process for pushing legal information to a subscriber's mobile data device within a location-based legal information service that is implemented in accordance with the present invention.

With reference now to FIG. 5B, a flowchart depicts a server-based process for pushing legal information to a subscriber's mobile data device within a location-based legal information service that is implemented in accordance with the present invention. The process that is depicted within FIG. 5B is similar to the process that is depicted within FIG. 5A, but the process shown within FIG. 5B operates in accordance with a server-centric data model.

The process begins by getting a subscriber's current location (step 522) and then compiling a list of laws that are applicable to the subscriber's location (step 524). At this point, the list of laws may correspond to those sets of laws for jurisdictions that include the subscriber's current geographic location. The list of applicable laws is then processed in accordance with system-related factors that are stored in the subscriber's profile information (step 526), such as purchased subscription features. The list of applicable laws is also narrowed in accordance with the subscriber's previously specified activity preferences (step 528), such as transportation activities. After generating the appropriate legal information for the subscriber, the legal information is pushed to the subscriber's mobile data device (step 530).

Since the geocoded legal information subsystem may be able to determine a level of importance to the legal information update that is being generated, which may be associated with the severity of punishment that is related to a criminal statute, the service may compute a priority level to the legal information update. In any case, a determination is then made as to whether or not an alert should be immediately presented to the subscriber (step 532). If not, then the process is complete, but if so, then an alert is immediately sent to the subscriber's mobile data device (step 534). The manner in which the alert is presented may vary depending on a priority of the alert, e.g., low priority alerts may be flashed on the display of the mobile data device while high priority alerts may also be accompanied by an audible warning that is generated by the mobile data device. The process is then complete.

Figure 5C:
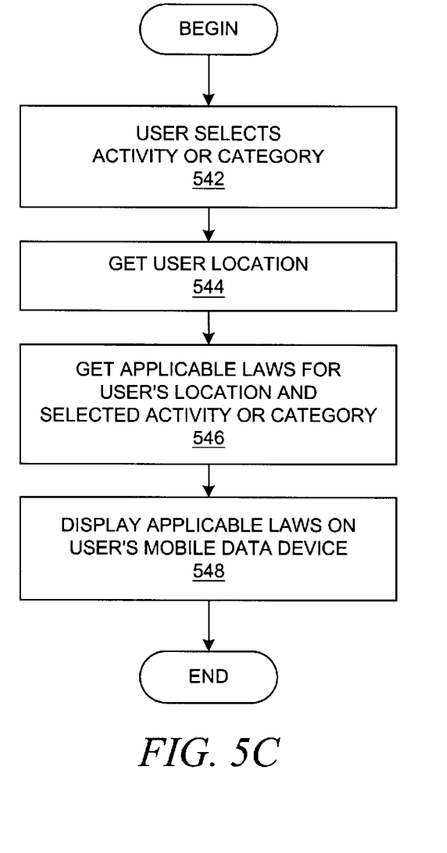
FIG. 5C is a flowchart depicting a client-based process for determining relevant legal information on a subscriber's mobile data device within a location-based legal information service that is implemented in accordance with the present invention.

With reference now to FIG. 5C, a flowchart depicts a client-based process for determining relevant legal information on a subscriber's mobile data device within a location-based legal information service that is implemented in accordance with the present invention. The process shown in FIG. 5C may be used by an embodiment of the present invention that is client-centric yet also non-real-time. In this particular embodiment, the subscriber initially selects a particular category or activity (step 542), after which the location-based legal information application obtains the subscriber's current location (step 544). The application then obtains the applicable laws for the subscriber's location and selected activity or category (step 546), and the retrieved information is then displayed for the subscriber (step 548). In this manner, the service discovers legal information that is relevant to the subscriber's specified interests while also limiting the legal information based on the subscriber's current geographic location. However, the service is rather static as it does not actively track the subscriber's current location in order to present dynamic updates.

Figure 5D:
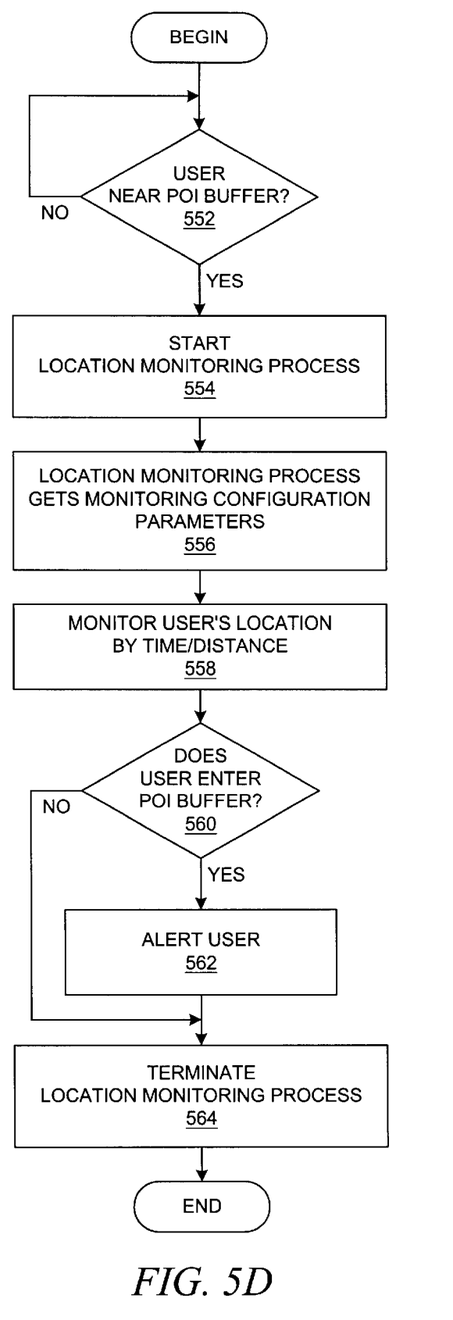
FIG. 5D is a flowchart depicting a client-centric location monitoring process that may be used within an embodiment of the present invention.

With reference now to FIG. 5D, a flowchart depicts a client-centric location monitoring process that may be used within an embodiment of the present invention. In contrast to the static processing of FIG. 5C, FIG. 5D actively tracks the subscriber's position, particularly with respect to nearby points-of-interest.

FIG. 3 described a POI "boundary" that may be legally defined around a particular type of point-of-interest; if someone commits a certain act within the POI boundary, then the person may be found to have committed an illegal act. In contrast to FIG. 3, FIG. 5D monitors a subscriber's position with respect to a service-defined "buffer" around a point-of-interest, a point-of-interest boundary, or some other geographical location.

For instance, a law may be defined with respect to a class of points-of-interest. If the service alerted a subscriber about the existence of a law with respect to a particular point-of-interest only after the subscriber had already entered the particular point-of-interest, then the subscriber might already be committing an illegal act. Hence, a service-defined POI buffer is used to alert a subscriber to the existence of a nearby point-of-interest, a point-of-interest boundary, or some other geographical location.

For example, it may be illegal to transport or operate fireworks within a state park. However, a subscriber might think that it is only illegal to operate fireworks within a state park. If a subscriber were transporting fireworks near a state park, then the subscriber would need to know that it was illegal to transport those fireworks onto the grounds of the state park before the subscriber approached the entrance gate of the state park. The location-based legal information service can alert the subscriber to this type of condition prior to the subscriber acting in a manner contrary to law. Moreover, the service may charge a premium fee for this type of early-warning service.

The methodology begins by determining whether the subscriber's current geographic location is near a POI buffer nearby or surrounding a point-of-interest or other geographic location (step 552). If not, then the methodology cycles back to step 552. However, if the subscriber's current geographic location is near the buffer around a particular geographic region or location, then the methodology continues by starting a location monitoring process (step 554), such as a specially dedicated thread that monitors the current location of the mobile data device that is executing the thread. Monitoring configuration parameters can be retrieved to adjust the manner in which the current location is monitored (step 556), such as the system-specified distance that defines the buffer region. The process then monitors the subscriber's location (step 558) in accordance with the monitoring configuration parameters.

At some point, a determination is made as to whether or not the subscriber has entered the system-defined buffer region that has been associated with a legal restriction for a particular region or location (step 560). If the subscriber enters the buffer region, then the subscriber is alerted in an appropriate manner (step 562), which may include visual or audible warnings on the mobile data device; if the subscriber never enters the buffer region, then the methodology never warns the subscriber. In either case, when the subscriber has moved away from the buffer region, which may be defined within the system-specified monitoring configuration parameters, then the location monitoring process is terminated (step 564).

Figure 5E:
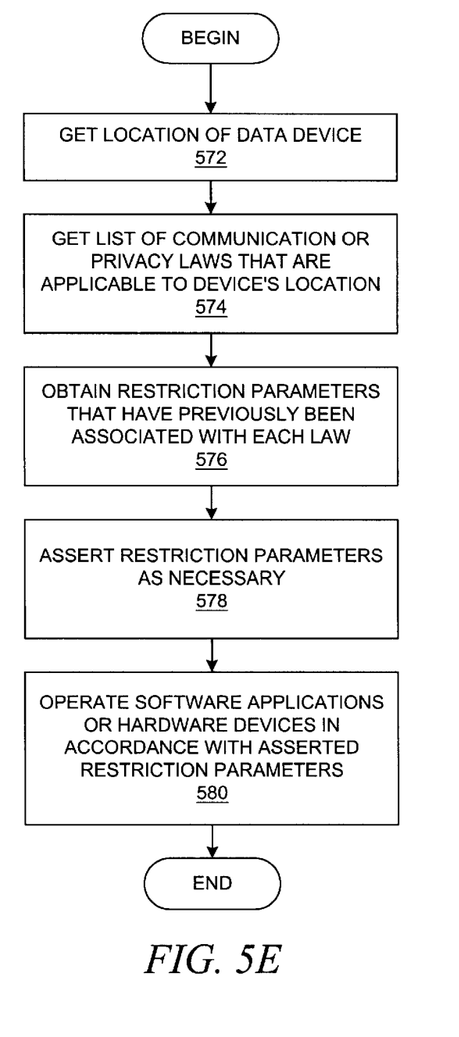
FIG. 5E is a flowchart depicting a process for adjusting the operational behavior of a software application or a hardware device with respect to a determined geographic location in conjunction with a location-based legal information service that is implemented in accordance with an embodiment of the present invention.

With reference now to FIG. 5E, a flowchart depicts a process for adjusting the operational behavior of a software application or a hardware device with respect to a determined geographic location in conjunction with a location-based legal information service that is implemented in accordance with an embodiment of the present invention. As described above with respect to FIGS. 5A–5D, a location-based legal information service presents legal information to a subscriber so that the subscriber may be aware of legal restrictions on the activities of the subscriber, thereby allowing the subscriber to alter his/her behavior to avoid violating the law. In FIG. 5E, an exemplary process depicts how the location-based legal information service may be used to alter the programmatic or data processing behavior of a part of a distributed data processing system.

For example, many privacy laws have been promulgated that restrict the type of information that may be gathered about consumers. However, different jurisdictions have different laws; some jurisdictions may prohibit the gathering of any consumer information without the consumer's knowledge, while other jurisdictions may allow the gathering of consumer information as long as it is accomplished in an anonymous manner such that the consumer information comprises only collective information on general groups of consumers. As a result, a jurisdiction may or may not allow the use of cookies to track the Web-viewing habits of a consumer.

An enterprise must be careful to comply with applicable laws that govern its operations. The present invention provides a methodology for allowing an enterprise to dynamically alter the operational behavior of its data processing systems such that they comply with currently applicable laws.

The process begins by obtaining the location of a data device (step 572), which may be either a mobile data device or a stationary data device. The location-based legal information service is then used to obtain a list of communication or privacy laws that are applicable to the device's location (step 574), i.e., that are applicable to the jurisdictions in which the device is located. Whereas the location of a client device was discussed above with respect to FIG. 3, the device discussed with respect to FIG. 5E may also include a server device.

At some previous point in time, the legal databases in the location-based legal information service have been configured or initialized to comprise restriction parameters or restriction rules for the operation of software or hardware systems. Appropriate sections of statutes or regulations within the legal databases can be associated with references to these restriction parameters or rules that indicate the manner in which a data processing system should operate, such as whether or not cookies may be cached on a client device or other similar rules. Therefore, after a list of applicable laws has been compiled, the restriction parameters or rules associated with the laws in this list may be retrieved (step 576) and then asserted within the appropriate data processing systems as necessary (step 578). The software applications or hardware devices within the affected data processing systems then operate in accordance with the asserted restrictions (step 580). The location of the affected data processing systems could be checked periodically to determine whether the asserted restriction parameters should be removed or changed.

In the prior art, an enterprise had to rely on a truthful response by a consumer to an inquiry about the location of the consumer. With the present invention, an enterprise can dynamically determine the location of a device and then alter the operation of the system in accordance with current legal restrictions.

As noted above, various processes within the location-based legal information service may be performed at a server or at a client in accordance with the particular processing model that is used to implement the present invention. It should be noted that some of the individual steps that are depicted within the flowcharts in FIGS. 5A–5E may be executed at a central server, such as LBLIS server 202 in FIG. 2A, while other steps may be executed on mobile data devices, such as subscriber clients 204.

The advantages of the present invention should be apparent in view of the detailed description of the invention that is provided above. In the prior art system, a person who needed legal information about restricted activities would be required to perform legal research through some appropriate means, e.g., through a commercial database or on the World Wide Web. After gathering information on potentially applicable laws, the person would need to ascertain whether the laws were applicable to the prospective acts by determining the desired location or region in which the activities would be performed and by discovering which laws were applicable to the location or region. Such legal research may be taxing even for law-abiding citizens, and many people merely limit their behavior in accordance with common sense while remaining ignorant of possible laws.

With the present invention, law-abiding citizens who are aware that laws may be applicable to their activities can be informed or alerted to potential legal restrictions by a location-based legal information service prior to participating in a legally restricted activity. The location-based legal information service obtains a user's location and determines the applicable laws. In this manner, a law-abiding citizen can avoid violating a legal restriction. The type of information that is supplied to the user may be tailored to the user's personal profile, such as age, or to the user's specified or selected preferences.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for providing an information service, the method comprising:

receiving, at a data processing device, user specification of a type of user activity or a category of user activities;

determining a current location of the data processing device;

retrieving legal information based on the determined current location of the data processing device;

limiting the retrieved legal information based on the user-specified type of user activity or the user-specified category of user activities; and displaying the limited legal information on a display means of the data processing device.

2. The method of claim 1 further comprising:

automatically monitoring the location of the data processing device;

automatically determining a current location of the data processing device that differs from a previous location of the data processing device; and updating the retrieved legal information based on the determined current location of the data processing device.

3. The method of claim 1 further comprising:

determining one or more jurisdictions that include the determined location of the data processing device; and limiting the retrieved legal information based on the one or more determined jurisdictions.

4. The method of claim 1 wherein the retrieved legal information is textual information representing statutes, regulations, or ordinances promulgated by a government entity.

5. The method of claim 1 further comprising:

alerting a user of the data processing device to a presence of applicable retrieved legal information.

6. The method of claim 1 further comprising:

limiting the retrieved legal information based on a user-specified personal characteristic.

7. The method of claim 1 wherein the retrieved legal information is applicable to regulating or restricting activities of the data processing device.

8. The method of claim 1 further comprising:

operating the data processing device or a software application executing on the data processing device in accordance with the retrieved legal information, wherein the retrieved legal information comprises a privacy law or privacy regulation.

9. The method of claim 1 further comprising:

limiting the displaying of the limited legal information on a display means of the data processing device to time periods in which the data processing device is within a predetermined distance of a user-specified geographical location.

10. The method of claim 1 wherein the step of displaying the limited legal information on a display means of the data processing device further comprises:

indicating a jurisdictional boundary for the limited legal information or a temporal duration for the limited legal information.

11. The method of claim 1 wherein the location of the data processing device is determined via a Global Positioning System (GPS).

12. The method of claim 1 wherein the location of the data processing device is determined via an emergency 911 positioning system (E911).

13. The method of claim 1 wherein the retrieved legal information is collocated with the data processing device.

14. The method of claim 1 wherein the retrieved legal information is stored on a server and pushed to the data processing device.

15. A computer program product on a computer-readable medium for providing an information service, the computer program product comprising:

instructions for receiving, at a data processing device, user specification of a type of user activity or a category of user activities;

instructions for determining a current location of the data processing device;

instructions for retrieving legal information based on the determined current location of the data processing device;

instructions for limiting the retrieved legal information based on the user-specified type of user activity or the user-specified category of user activities; and instructions for displaying the limited legal information on a display means of the data processing device.

16. The computer program product of claim 15 further comprising:

instructions for automatically monitoring the location of the data processing device;

instructions for automatically determining a current location of the data processing device that differs from a previous location of the data processing device; and instructions for updating the retrieved legal information based on the determined current location of the data processing device.

17. The computer program product of claim 15 further comprising:

instructions for determining one or more jurisdictions that include the determined location of the data processing device; and instructions for limiting the retrieved legal information based on the one or more determined jurisdictions.

18. The computer program product of claim 15 wherein the retrieved legal information is textual information representing statutes, regulations, or ordinances promulgated by a government entity.

19. The computer program product of claim 15 further comprising:

instructions for alerting a user of the data processing device to a presence of applicable retrieved legal information.

20. The computer program product of claim 15 wherein the retrieved legal information is applicable to regulating or restricting activities of the data processing device.

21. The computer program product of claim 15 further comprising:
   instructions for operating the data processing device or a software application executing on the data processing device in accordance with the retrieved legal information, wherein the retrieved legal information comprises a privacy law or privacy regulation.

22. The computer program product of claim 15 further comprising:
   instructions for limiting the displaying of the limited legal information on a display means of the data processing device to time periods in which the data processing device is within a predetermined distance of a user-specified geographical location.

23. The computer program product of claim 15 wherein the instructions for displaying the limited legal information on a display means of the data processing device further comprises:
   instructions for indicating a jurisdictional boundary for the limited legal information or a temporal duration for the limited legal information.

24. An apparatus for providing an information service, the apparatus comprising:
   means for receiving, at a data processing device, user specification of a type of user activity or a category of user activities;
   means for determining a current location of the data processing device;
   means for retrieving legal information based on the determined current location of the data processing device;
   means for limiting the retrieved legal information based on the user-specified type of user activity or the user-specified category of user activities; and
   means for displaying the limited legal information on a display means of the data processing device.

25. The apparatus of claim 24 further comprising:
   means for automatically monitoring the location of the data processing device;
   means for automatically determining a current location of the data processing device that differs from a previous location of the data processing device; and
   means for updating the retrieved legal information based on the determined current location of the data processing device.

26. The apparatus of claim 24 further comprising:
   means for determining one or more jurisdictions that include the determined location of the data processing device; and
   means for limiting the retrieved legal information based on the one or more determined jurisdictions.

27. The apparatus of claim 24 wherein the retrieved legal information is textual information representing statutes, regulations, or ordinances promulgated by a government entity.

28. The apparatus of claim 24 wherein the retrieved legal information is applicable to regulating or restricting activities of the data processing device.

29. The apparatus of claim 24 further comprising:
   means for operating the data processing device or a software application executing on the data processing device in accordance with the retrieved legal information, wherein the retrieved legal information comprises a privacy law or privacy regulation.

30. The apparatus of claim 24 wherein the means for displaying the limited legal information on a display means of the data processing device further comprises:
   means for indicating a jurisdictional boundary for the limited legal information or a temporal duration for the limited legal information.

* * * * *